United States Patent
Padmanabhan

(10) Patent No.: US 11,468,406 B2
(45) Date of Patent: Oct. 11, 2022

(54) METHOD OF CONVERTING LANGUAGE-BASED WRITTEN CONTRACT TO SMART LEGAL CONTRACT USING NATURAL LANGUAGE PROCESSING

(71) Applicant: salesforce.com, inc., San Francisco, CA (US)

(72) Inventor: Prithvi Krishnan Padmanabhan, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 500 days.

(21) Appl. No.: 16/051,400

(22) Filed: Jul. 31, 2018

(65) Prior Publication Data
US 2020/0042939 A1 Feb. 6, 2020

(51) Int. Cl.
*G06Q 10/10* (2012.01)
*G06Q 10/06* (2012.01)
*G06F 40/51* (2020.01)
*G06F 40/157* (2020.01)
*G06F 40/205* (2020.01)

(52) U.S. Cl.
CPC .......... *G06Q 10/10* (2013.01); *G06F 40/157* (2020.01); *G06F 40/205* (2020.01); *G06F 40/51* (2020.01); *G06Q 10/067* (2013.01)

(58) Field of Classification Search
None
See application file for complete search history.

(56) References Cited

U.S. PATENT DOCUMENTS 7,433,838 B2 * 10/2008 Welsh .................... G06Q 40/00 705/35
9,239,713 B1 * 1/2016 Lakshman .............. G06F 9/451
(Continued)

FOREIGN PATENT DOCUMENTS

WO   WO2011146711 A1 * 11/2011 ............. G07B 17/00

OTHER PUBLICATIONS

Nick Szabo, "Smart Contracts: Building Blocks for Digital Markets", https://www.fon.hum.uva.nl/rob/Courses/InformationInSpeech/CDRQM/Literature/LOTwinterschool2006/szabo.best.vwh.net/smart_contracts_2.html, (1996). (Year: 1996).*
(Continued)

*Primary Examiner* — Paul R Fisher
(74) *Attorney, Agent, or Firm* — Sterne, Kessler, Goldstein & Fox P.L.L.C.

(57) ABSTRACT

Disclosed herein are system, method, and computer program product embodiments for processing a written-language contract using an industry-specific natural language processing model to determine flows or actions to undertake in a Customer Relationship Management (CRM) solution. A CRM solution may include the ability to receive or create a binding natural-language contract. The CPQ or CRM system may use natural language processing (NLP) to determine terms and conditions included in a natural-language contract. The NLP may further use an industry-specific model that may be determined based on information in the CRM solution to more efficiently and accurately analyze the natural-language contract. The CRM solution may further receive a legal language construct and convert the terms of the legal language construct into a smart contract.

20 Claims, 5 Drawing Sheets

(56) References Cited

U.S. PATENT DOCUMENTS

| | | | | |
|---|---|---|---|---|
| 2004/0030421 | A1* | 2/2004 | Haley | G06N 5/025 |
| | | | | 706/45 |
| 2006/0143034 | A1* | 6/2006 | Rothermel | G06Q 10/10 |
| | | | | 705/301 |
| 2008/0114628 | A1* | 5/2008 | Johnson | G06Q 10/06311 |
| | | | | 707/792 |
| 2009/0327179 | A1* | 12/2009 | Strassner | H04L 41/5003 |
| | | | | 706/14 |
| 2011/0137742 | A1* | 6/2011 | Parikh | G06Q 30/0635 |
| | | | | 705/26.1 |
| 2013/0066677 | A1* | 3/2013 | Killoh | G06Q 30/0277 |
| | | | | 705/7.29 |
| 2013/0085800 | A1* | 4/2013 | Radkowski | G06Q 10/0635 |
| | | | | 705/7.28 |
| 2019/0102850 | A1* | 4/2019 | Wheeler | G06Q 20/102 |
| 2019/0205636 | A1* | 7/2019 | Saraswat | G06F 16/93 |

OTHER PUBLICATIONS

Jemima Kelly, "UBS leads team of banks working on blockchain settlement system" https://www.reuters.com/article/us-banks-blockchain-ubs-idUSKCN10Z147, Aug. 24, 2016. (Year: 2016).*

Katja Harej, Romana Vajde Horvat, "Customer Relationship Management Momentum for Business Improvement", 26th Int. Conf. information Technology Interfaces /T/ 2004, Jun. 7-10, 2004, Cavtat, Croatia, . (Year: 2004).*

P. R. Krishna and K. Karlapalem, "Electronic Contracts," in IEEE Internet Computing, vol. 12, No. 4, pp. 60-68, Jul.-Aug. 2008, doi:10.1109/MIC.2008.77. (Year: 2008).*

Yang Xu, Qing Duan and Hongji Yang, "Web-Service-Oriented Customer Relationship Management System Evolution," 13th IEEE International Workshop on Software Technology and Engineering Practice (STEP'05), 2005, pp. 39-48, doi: 10.1109/STEP.2005.35. (Year: 2005).*

* cited by examiner

METHOD OF CONVERTING LANGUAGE-BASED WRITTEN CONTRACT TO SMART LEGAL CONTRACT USING NATURAL LANGUAGE PROCESSING

BACKGROUND

Organizations or individuals may use a cloud computing platform to manage relationships with customers, i.e., a Customer Relationship Management (CRM) solution. A CRM solution may include an automated configure, price, quote (CPQ) solution to facilitate dynamic price quoting across a range of products and services. A CPQ solution may automatically generate billing information, contracts, quotes, invoices, and proposals to instantly provide customers with pricing information. CRM solutions may be used across a range of industries.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
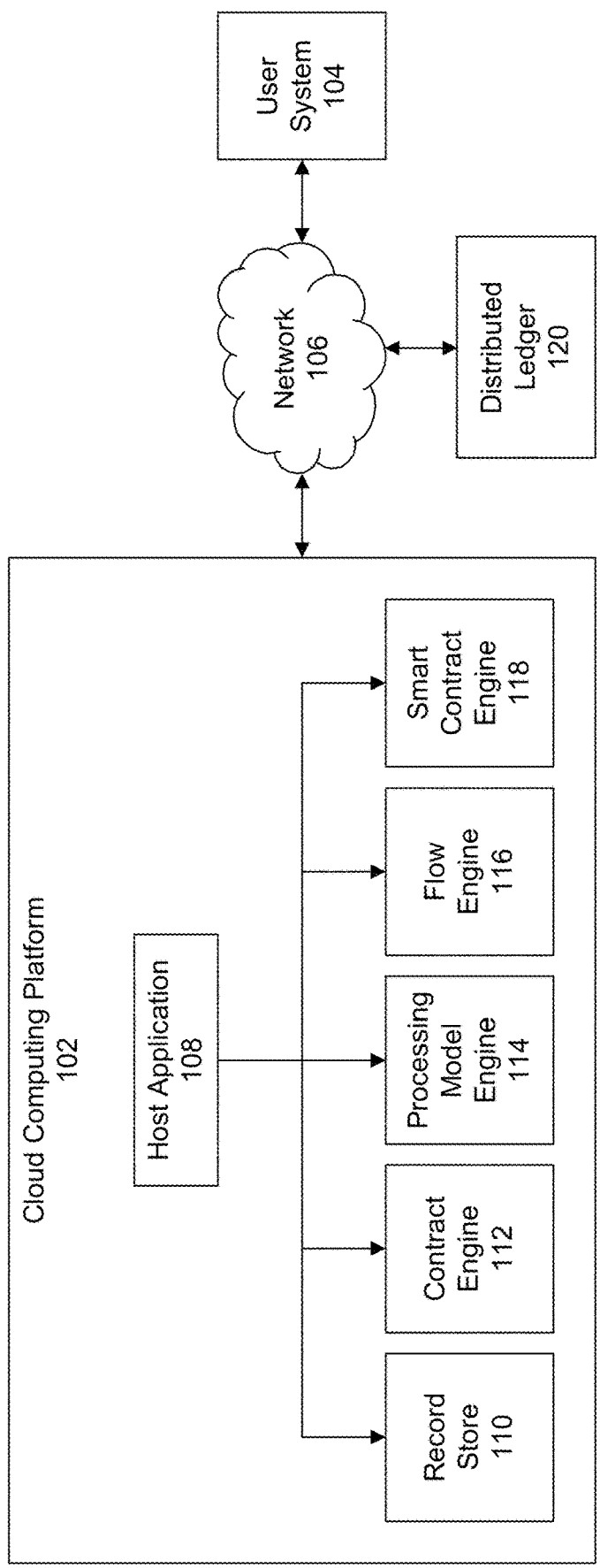
FIG. 1 is a block diagram of a cloud computing system, according to some embodiments.

Provided herein are system, apparatus, device, method and/or computer program product embodiments, and/or combinations and sub-combinations thereof, for processing a written-language contract using an industry-specific natural language processing model.

A CRM solution may allow businesses and organizations to manage customer relationships and organize data associated with those relationships. A CRM solution may provide cloud-based applications, services, marketing, e-commerce tools, and other support to businesses and customers of those businesses. A CRM solution may allow organizations to manage data reflecting transactions between, with, and/or among customers and to harness that data to derive analytical conclusions. A CRM solution may include mobile support and mobile applications. A CRM solution may integrate help-desk personnel and subject-matter experts to further enhance users' experiences.

A CRM solution may also provide a CPQ extension, i.e., a CPQ system or module operating natively within a cloud-based CRM solution or otherwise integrated therein. The CPQ system may provide functionality within the cloud-computing platform to furnish accurate quotes to customers and potential customers regarding products, goods, services, etc. offered by the organization. A CPQ system may create estimates, proposals, orders, and other contractual documents. A CPQ system may track goods and services offered by businesses as well as prices associated with those goods and services. A CPQ system may include business logic addressing various customer relationships, sales trends, and other marketplace characteristics. A CPQ system may suggest other goods, services, or add-ons to a customer. A CPQ system may generate a contract internally or receive a contract completed externally and process the contract to determine terms, parties, conditions, etc.

A CPQ system may further include the ability to generate a binding contract, send an invoice/bill, and collect funds related to the purchase, i.e., provide a quote-to-cash system. In addition to determining goods, services, and pricing, a CPQ system providing quote-to-cash functionality may enforce contracts, negotiate contracts, create invoices, collect payments, renew contracts, renegotiate subsequent contracts, and perform other suitable actions. Additionally, a CPQ system may create and enforce binding smart contracts for verification via blockchain or distributed ledger technology (DLT). The DLT technology may use a digitized, decentralized public ledger of transactions. Transactions may be added to the ledger in chronological order, and each node stores a copy of the ledger. Smart contracts inserted into the ledger may be verified via all system nodes as opposed to a centralized authority. Various types of smart contracts may be created and configured by administrators of the CRM system or representatives of the business or organization. A CRM system may provide tools to ease the configuration/programming burden inherent in deploying a smart contract.

A CPQ or CRM system may use natural language processing (NLP) to determine terms and conditions within in a natural-language contract. In general, NLP may provide a manner of analyzing and understanding human language by an automated system. NLP may use machine learning and language analysis to ascertain the parties involved, relationships between the parties, sentiments expressed by those parties, etc. In the context of CPQ, this information may include the parties to the contract, goods or services, quantities, price terms, delivery terms, temporal durations, penalty provisions, buy-outs, additional conditions, and other suitable contractual terms. NLP may harness a model, i.e., supervised machine learning, to further support text extraction and analysis. NLP may use a dictionary associated with the model to derive further meaning from natural language. NLP may invoke formal rule definitions, statistical language modeling, connectionist language modeling, vector space modeling, neural language modeling, or other manners of analyzing human language.

The NLP may be further improved by using an industry-specific model, wherein the NLP determines the terms and conditions in the contract in part based on the particularities of a relevant industry. A CRM system knows the industry applicable to the contract and may capitalize on this information to formulate a more predictive NLP. Thus, industry-specific NLP may be needed in a CRM solution.

FIG. 1 is a block diagram of cloud computing system 100, according to some embodiments. Cloud computing system 100 may include cloud computing platform 102, user system 104, network 106, host application 108, record store 110, contract engine 112, processing model engine 114, flow engine 116, and distributed ledger 120. Cloud computing system 100 may connect cloud computing platform 102 to user system 104 and distributed ledger 120 via network 106. As would be appreciated by a person of ordinary skill in the art(s), cloud computing platform 102 may be connected to multiple instances of user system 104.

Cloud computing platform 102 may be a server computer, desktop computer, laptop, tablet, mobile device, wearable electronic device, or other electronic device. Cloud computing platform 102 may also be a software platform for cloud computing. For example, cloud computing platform 102 may be Software as a Service (SaaS) cloud platform where a user subscribes to an application accessible via the Internet. Cloud computing platform 102 may provide CRM-related services, including CPQ services and functionality. Cloud computing platform 102 may provide a litany of other functionalities.

User system 104 may be a system used by an end user to interact with cloud computing platform 102. User system 104 may be a cellphone, smartphone, tablet computer, laptop computer, desktop computer, web browser, or any other suitable computing device. User system 104 may be configured to connect to and communicate with cloud computing platform 102. An individual employing user system 104 may be a business owner, employee, agent, or another suitable user interacting with information relevant to a business, company, non-profit, governmental agency, or any other suitable organization. Conversely, an individual employing user system 104 may interact with cloud computing platform 102 for reasons unrelated to any business or organizational goals. User system 104 may create a contract, upload a contract, or import a contract into cloud computing platform 102.

Network 106 may be any network or combination of networks including the Internet, a local area network (LAN), a wide area network (WAN), a wireless network, a cellular network, or various other types of networks as would be appreciated by a person of ordinary skill in the art.

Host application 108 may be a specific application included in cloud computing platform 102. For example, host application 108 may be a CRM application currently running on cloud computing platform 102. Host application 108 may include CPQ extensions, modules, and/or interfaces. In some embodiments, host application 108 may be a web application designed to run inside a web browser. In some other embodiments, host application 108 may be a software application designed to run on a server computer, desktop computer, or other type of electronic device. Host application 108 may run on a mobile platform to facilitate mobile use. Host application 108 may function, operate, run, or execute on any underlying suitable operating system environment. As would be appreciated by a person of ordinary skill in the art(s), host application 108 may be another type of software application.

Record store 110 may be a database or other type of data store. Record store 110 may store fields related to the organization/business, sales, customers, suppliers, competitors, leads, etc. Record store 110 may store industry-specific processing models, natural-language-processing constructs, and standardized contracts. Record store 110 may store appropriate flows comprising actions to complete in cloud computing platform 102 and relationships between those actions. Record store 110 may use a relational database harnessing any commercially available database management system. In an embodiment, record store 110 implements a centralized storage area network (SAN), network-attached storage (NAS), redundant array of independent disks, and/or any other configuration of storage devices to supply sufficient storage capacity to store the needed database tables and supporting structures. Sufficient storage alternatively exists in any other physically attached magnetic storage, cloud storage, or additional storage medium. In an embodiment, record store 110 deploys a commonly used hard-disk interface, such as ATA, SATA, SCSI, SAS, and/or fibre for interfacing with stored data.

Contract engine 112 may manage, store, create, delete, update, and/or otherwise manipulate contracts in cloud platform 102 and host application 108. In one embodiment, contract engine 112 may be used by cloud computing platform 102 to generate contracts in cloud computing platform 102. Contract engine 112 may create a contract using an appropriate document generation tool, for example, a pdf-generating tool, word-document-generating tool, or text-generation tool. Contract engine 112 may extract information about a business generating a contract from record store 110 and use the information while generating the generated contract. Contract engine 112 may employ electronic signature technology to receive binding signatures from the parties to the contract. In another embodiment, contract engine may receive a contract entered into externally and store the contract in record store 110.

Processing model engine 114 may create, store, and harness natural language processing models to parse and interpret natural-language contracts. Processing model engine 114 may use a distributional approach, frame-based approach, model-theoretical approach, interactive learning, etc. to derive appropriate terms, conditions, and parties from natural language contracts received or created by contract engine 112. Processing model engine 114 may store natural-language processing models in record store 110 and associate those natural-language processing models with an industry. In an embodiment, processing model engine 114 knows the industry based on a stored industry type in host application 108. Cloud computing system 102 knows the customer, business, or organization based on data stored in record store 110, e.g., if the customer is a bank then the industry may be "finance," if the customer is a hospital, then the industry may be "healthcare." In another embodiment, this information may be available via the organization or can be obtained from other APIs. For example, predefined NLP models with specific domain languages may be available in cloud computing platform 102 for each industry. For example, an instance of user system 104 in the finance industry may use a model and dictionary designed specifically for the finance industry, while an instance of user system 104 in the healthcare industry may use a model and dictionary designed specifically for the healthcare industry.

Flow engine 116 may store, create, and enforce flows, i.e., grouped collections of actions within cloud computing platform 102. In an embodiment, a flow may automate, recreate, or represent business processes in cloud computing platform 102. A flow may include stages representing states within the flow that a user may reach and actions connecting stages, i.e., serving as transitions between stages. In an embodiment, flow engine 116 may provide an interface through which standardized, industry-specific, or organization-specific flows may be created. The interface may further facilitate modification to or update of flows stored in record store 110. In an embodiment, flow engine 116 may allow users to view flow progress within cloud computing platform 102 and host application 108. For example, a flow may onboard a new customer for a business. Exemplary actions in an onboarding flow may include: receiving demographic information, creating an account, determining a contact or opportunity, etc. In this example, an exemplary stage may be "received demographic information." This stage may be entered into once flow engine 116 receives demographic information and exited once flow engine 116 creates the account. In some embodiments, only by completing an appropriate action may a user advance to the next stage in the flow. Some actions may return a user to a previous stage. Some actions may not advance or change the stage. Flows may integrate iterative or conditional logic. In yet another embodiment, flow engine 116 may interact with distributed ledger 120, described in further detail below, to enforce created flows. As described in further detail below with reference to FIG. 2, a flow may be created automatically upon reception of an imported contract or upon creation of a contract created internally. In the context of a CPQ system, the process described above to onboard a new customer could be created when an enforceable contract is created or received with the new customer.

Smart contract engine 118 may facilitate the reception of a legal language contract and the subsequent creation and deployment of a smart contract to a DLT or blockchain. By using a DLT or blockchain, cloud computing platform 102 may enforce the smart contract without intermediaries or mediators. Smart contract engine 118 may provide an interface into which a representative of a business or an administrator of host application 108 may enter a legal language construct. In an embodiment, the representative or administrator may import an appropriate legal language construct or provide such a construct through any other appropriate means. Such a legal language construct may include parties, terms, conditions, and other suitable legal language reflecting a transaction, exchange, or dispute. Smart contract engine 118 may then convert the legal language construct into a smart contract. The conversion may result in programmatic logic, i.e., code, representing repeatable transactions. Smart contract engine 118 may thus verify the transactions using a DLT and provide enforcement mechanisms regarding those transactions. An exemplary smart contract may include signatories, terms, conditions, and programmable logic, e.g., if/then statements, and other constructs related to the implementation of the terms, parties, and conditions received by smart contract engine 118. Smart contract engine 118 may distribute deploy and/or invoke the generated smart contract onto distributed ledger 120, described in further detail below. Smart contract engine 118 may also provide tools by which to interact further with the deployed smart contract, e.g., viewing blockchain logs, modifying related variables, viewing the smart contract details, modifying or editing the smart contract, or any other suitable interaction.

Distributed ledger 120 may be a shared and synchronized database spread across multiple clients used to determine consensus among transacting parties. Distributed ledger 120 may include blockchain technology. Blockchains may be, for example, permissionless blockchains, permissioned blockchains (consortium blockchains), or any combination thereof, including hybrid blockchains. Any method(s), function(s), mechanism(s), model(s), or protocol(s) may be used for validating related transactions, identities of parties, etc., to establish consensus. Some examples of consensus validation models may include proof-of-stake, proof-of-space, proof-of-authority, and proof-of-work, including reusable proof-of-work. Distributed ledger 120 may further enforce smart contracts that enable the performance of credible transactions without involving third-party verifiers.

Figure 2:
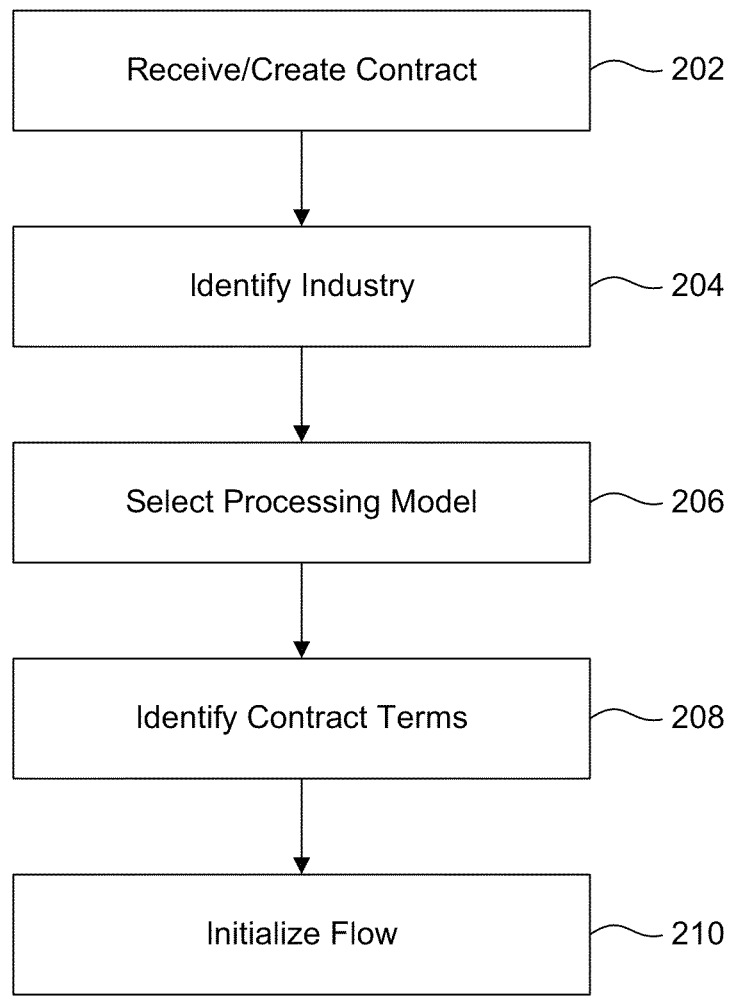
FIG. 2 is a flowchart illustrating example operations in a cloud computing platform for using industry-specific processing models to identify contract terms in natural language contracts and create appropriate flows, according to some embodiments.

FIG. 2 is a flowchart illustrating a method 200 of using industry-specific processing models to identify contract terms in natural language contracts and create flows, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to that example embodiment.

In 202, host application 108 may receive a natural-language contract via contract engine 112. In an embodiment, host application 108 may employ contract engine 112 to create the natural-language contract internally. In another embodiment, host application 108 may receive an externally generated contract and parse or interpret the externally generated contract. The externally generated contract may be imported into cloud computing platform from user system 104 and assimilated using contract engine 112. Natural-language contracts may be written in any suitable natural language, e.g., English, French, Spanish, Japanese, etc. One skilled in the art(s) will appreciate that the specific language, terms, and conditions of a contract may vary according to the relevant industry. For example, a contract in the insurance industry may be more likely to refer to contracting parties as "insurers" and "insured," whereas a contract in the retail industry may be more likely to refer to contracting parties as "sellers" and "buyers." In another example, if the industry is health care, then a contract relevant to that industry may be more likely to include a patient confidentiality clause and may include terms such as "confidential," "protected," "misappropriate," etc. As described above, cloud computing platform 102 may service organizations across a vast swathe of possible industries.

In 204, host application 108 may identify the specific industry applicable to the natural-language contract received in 202. In an embodiment, the specific industry may be apparent based on the customer creating the contract in host application 108 or the business authorizing the contract, i.e., based upon the contracting parties. For instance, if host application 108 creates a contract for a banking customer, then the industry may be determined to be "finance." In another embodiment, contract engine 112 may preliminarily parse the imported contract to determine an appropriate industry based on the language of the contract. In an alternate embodiment, for imported contracts, the customer to which the contract is imported may have an associated industry, and host application 108 may determine the specific industry applicable to the natural-language contract based on this association.

In 206, host application 108 may employ processing model engine 114 to select an appropriate processing model based upon the specific industry determined in 204. The processing model may invoke formal rule definitions, statistical language modeling, connectionist language modeling, vector space modeling, and/or neural language modeling. In an embodiment, the model may further comprise an NLP dictionary for the specific industry. Processing model engine 114 may retrieve a stored industry-specific processing model from record store 110. For example, if method 200 determined a specific industry of "finance" in 204, processing model engine 114 may select a processing model and dictionary specific to the finance industry. Alternatively, if method 200 determined an industry of "healthcare" in 204, processing model engine may select a processing model and dictionary specific to the healthcare industry. In an embodiment, the industry-specific model and dictionary may adhere to a naming convention for reference purposes, e.g., "model finance" and "dictionary finance" or "model_hc" and "dictionary_hc."

In 208, host application 108 may employ processing model engine 114 to identify terms and conditions in the contract handled in 202 using the processing model determined in 206. By applying the industry-specific processing model selected in 206 to the contract received in 202, processing model engine 114 may determine specific terms, conditions, parties, etc. within the natural-language contract. For example, in a sales contract, processing model engine 114 may use a model designed to determine the "buyer," the "seller," the "quantity," the "price," the "delivery terms," and other suitable constructs unique or typical in a sales contract. In another example, in a health care insurance contract, processing model engine, may use a model designed to determine the "patient," the "provider," the "monthly rate," the "plan type," and other suitable constructs related to a health care insurance contract.

In 210, host application 108 may employ flow engine 116 to initialize and commence a flow, i.e., a set of actions, in cloud computing platform 102 based on the terms and conditions identified in 208. In an embodiment, flow engine 116 may select a previously configured flow in cloud computing platform 102 to commence based on the identified terms and conditions, the industry, or other available indicators. In the sales contract example, flow engine 116 may commence a flow in cloud computing platform 102 that includes stages to "receive payment from customer," "ship goods to customer," "verify reception," etc. Furthermore, flow engine 116 may select an appropriate stage within the flow immediately applicable to the created flow. In the above example, flow engine 116 may commence the selected flow at the "ship goods to customer stage" if the parsed contract indicates that the customer previously rendered payment. One skilled in the arts will understand that flow engine 116 may create a large variety of actions, stages, and flows and that the flows may vary across the industry and among customers within an industry. By automatically initializing a flow in cloud computing platform 102 representing the actions specified in a natural language contract, enforcement and tracking of the contract may be easier, as described further below with reference to FIG. 3. In other embodiments, cloud computing platform 102 may create smart contracts for verification via blockchain or distributed ledger technology to additionally enforce the terms and conditions of the parsed contracts and track the enforcement using flows, also described further below with reference to FIG. 3.

Figure 3:
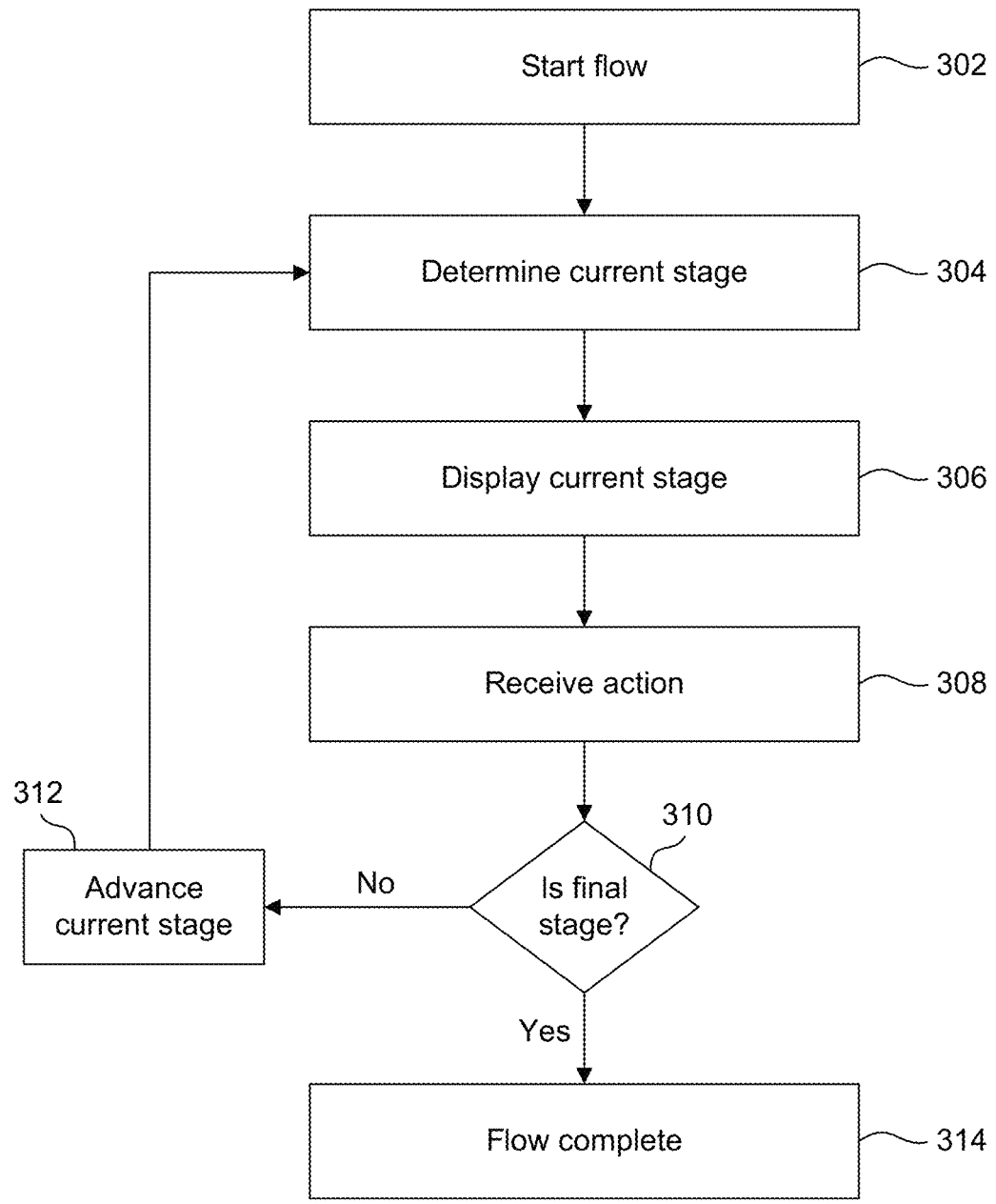
FIG. 3 is a flowchart illustrating a method of traversing an auto-generated flow in a cloud computing platform, according to some embodiments.

FIG. 3 is a flowchart illustrating a method 300 of traversing an auto-generated flow in a cloud computing platform, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to that example embodiment.

In 302, flow engine 116 starts a flow. In an embodiment, flow engine 116 may select a previously configured flow stored in record store 110 to start based on the terms and conditions identified by parsing a natural-language contract with an industry-specific model, as described above with reference to FIG. 2. Flow engine 116 may determine an appropriate user to start the flow for, and the deployed flow may be specific to that user. That is, only a specific user may complete actions leading to subsequent stages and ultimately complete the flow. In another embodiment, the flow may involve multiple users or parties. In this embodiment, a user may have permission to complete an action at one stage, and a separate user may have permission to complete a second action at a second stage. In an alternate embodiment, flow engine 116 may automatically configure and deploy a new flow comprising stages and actions to cloud computing platform 102. Cloud computing platform may track the user's progress towards flow completion and display this information visually. In yet another embodiment, cloud computing platform 102 may create a smart contract for verification via blockchain or distributed ledger technology that corresponds to the determined flow by interacting with distributed ledger 120.

In 304, flow engine 116 determines a current stage within the flow determined in 302. In an embodiment, the current stage may be the first stage in the determined flow. However, the initial stage is not necessarily the first stage. As described above, the current stage may be initialized to a secondary stage in a flow, as in the above-described example where the customer already rendered payment for a good. In another embodiment, cloud computing platform 102 may send appropriate transactions to distributed ledger 120 to synchronize the deployed smart contract in the blockchain with the current stage of the flow in cloud computing platform 102.

In 306, host application 108 displays the current stage. Host application 108 may display the current stage along with future and past stages, for example using a breadcrumb or other progress indicator. Host application 108 may indicate to a user any action(s) that need to be completed in order to advance to the next stage. Distributed ledger 120 may provide a mechanism by which to view the status of the smart contract in the blockchain.

In 308, host application 108 receives an action from a user. An action may complete a stage. An example action may be the completion of a form on a webpage. Flow engine 116 may update record store 110 to reflect the changed stage and completed action. Flow engine 116 may determine based on configured logic the next stage. In an embodiment, host application 108 may send an appropriate transmission to distributed ledger 120 to inform the digital ledger of the changed state. In an alternate embodiment, host application 108 may receive the notification of the completed action from distributed ledger 120. In this embodiment, flow engine 116 updates the flow, stage, and internal records in record store 110 accordingly based on the received completed action verified within distributed ledger 120.

In 310, flow engine 116 checks to see if the stage completed in 308 is the final stage in the flow determined in 302. If the stage is the final stage, then method 300 proceeds to 314. If the stage is not the final stage, then method 300 proceeds to 312.

In 312, flow engine 116 advances the current stage. In the above example, after receiving the completed action "shipped goods to customer," flow engine 116 could advance the current stage to the "verify receipt" stage. In an embodiment, conditional logic may apply, and flow engine 116 may need to analyze data in record store 110 to determine the appropriate next stage. For instance, in a purchasing flow, if a user selected "billing information same as shipping information" then a billing-information stage may be bypassed.

In 314, flow engine 116 may complete a flow. Host application 108 may display a verification message or perform any another suitable action. In one embodiment, records of the completed flow may be stored in record store 110. In an alternate embodiment, distributed ledger 120 may also store records of the completed actions.

Figure 4:
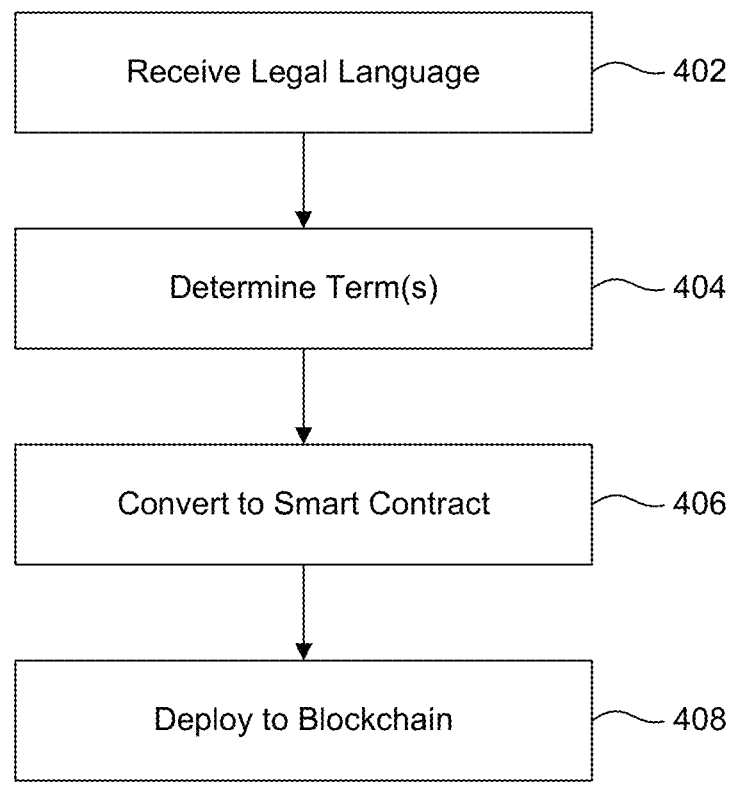
FIG. 4 is a flowchart illustrating a method of converting a legal language construct into a smart contract, according to some embodiments.

FIG. 4 is a flowchart illustrating a method 400 of converting a legal language construct into a smart contract, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 1. However, method 400 is not limited to that example embodiment.

In 402, smart contract engine 118 receives a legal language construct from an administrator or representative of a business or organization. Smart contract engine 118 may provide an interface into which a legal language construct may be entered. In one embodiment, smart contract engine 118 may receive the language in text or narrative form, i.e., written as a natural-language contract. In another embodiment, smart contract engine 118 may receive the legal language construct in web form data with the terms and conditions delineated individually or in another suitable format. For example, a price field may be provided into which a user could enter the price, a quantity field provided into which a user could enter the quantity, etc. In another embodiment, smart contract engine 118 receives an imported or uploaded file specifying the legal language construct.

In 404, smart contract engine 118 determines the terms, conditions, parties, and other information included in the legal language construct. As described above, in one embodiment, smart contract engine 118 receives a legal language construct in the form of natural language. In this embodiment, smart contract engine 118 may parse the natural language to determine the terms, conditions, and/or parties that will comprise the smart contract. In another embodiment, smart contract engine 118 determines the terms and conditions based on received web form data where smart contract engine 118 receives the terms and conditions specified individually. Smart contract engine 118 may apply a translation, dictionary, or glossary to determine the appropriate terms and conditions based on the received legal language construct.

In 406, smart contract engine 118 converts the terms and conditions determined in 404 into a smart contract. Such a smart contract may be code-based and implemented with a suitable instruction set or programming language. One exemplary instruction set or programming language may be Solidity, but another DLT-based smart-contract programming language may be used. In another embodiment, the smart contract may use any programming language or instruction set, which may be integrated into the DLT using an appropriate API or module, such as with Hyperledger. Smart contract engine 118 may employ pre-written code modules and deploy the modules into the created smart contract according to the terms and conditions. For example, smart contract engine 118 may place an initialization module at the start of the smart contract. In one embodiment, smart contract engine 118 may employ a term-to-code or condition-to-code translation file wherein smart contract engine 118 maps an identified term or condition to a subsequent set of instructions or code to include in the smart contract. In this fashion, smart contract engine 118 may create a deployable set of instructions functioning as a smart contract to reflect the legal language construct entered in 404. In some embodiments, the created code may need to be compiled, interpreted, built, or otherwise additionally modified to become a deployable smart contract.

In 408, smart contract engine 118 may deploy the smart contract to an appropriate DLT platform or blockchain, for example Expanse or Etherium. In an embodiment, distributed ledger 120 may use or harness a smart-contract platform or blockchain within distributed ledger 120. In some embodiments, deploying the smart contract may entail further modifications to the smart-contract code automatically generated in 406. In some embodiments, a node in the DLT may need to be created, furnished, or initialized before deploying the smart contract, and the node may need to be connected to an appropriate blockchain or network. Additionally, the node may need to be funded or initialized with a cryptocurrency. The node may need to be synced with the network or blockchain. Appropriate variables may need to be set or configured.

Figure 5:
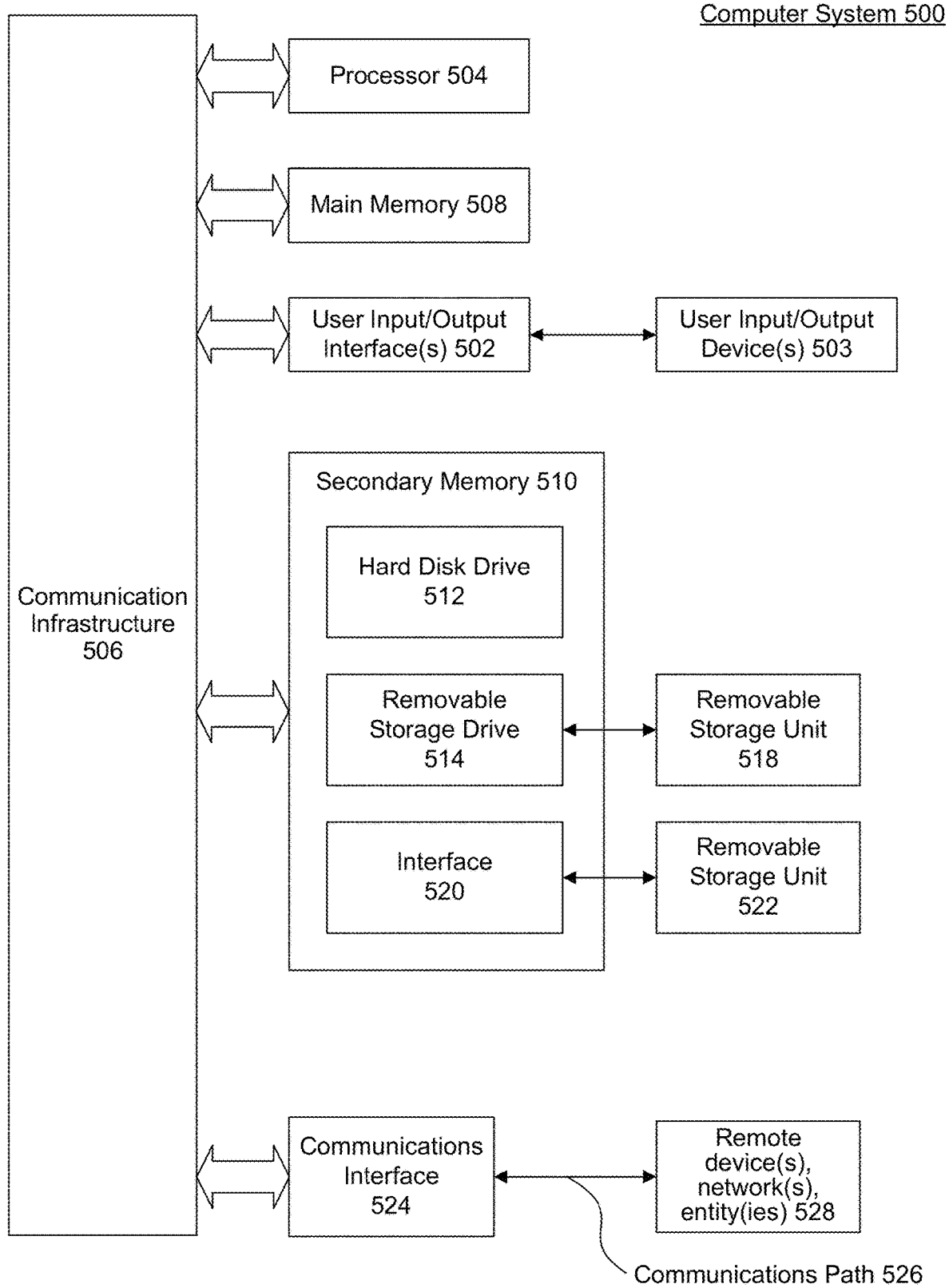
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure 306 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518.

Removable storage unit 518 may include a computer usable or readable storage device having stored thereon computer software (control logic) and/or data. Removable storage unit 518 may be a floppy disk, magnetic tape, compact disk, DVD, optical storage disk, and/ any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving, by one or more processors, a natural-language contract uploaded to a customer relationship management (CRM) tool by a customer;
retrieving, by the one or more processors, a processing model from a set of stored processing models by determining a stored industry type in the CRM tool and selecting the processing model for the stored industry type, wherein the processing model comprises a dictionary of terms used in contracts in the stored industry type;
determining, by the one or more processors, one or more contract terms in the natural-language contract by identifying a contract term in the one or more contract terms that equates to a term in the dictionary of terms;
determining, by the one or more processors, one or more actions performable in the CRM tool associated with the one or more contract terms;
creating, by the one or more processors, a flow in the CRM tool comprising the one or more actions and a plurality of stages having a first stage, wherein the first stage is a receive payment stage;
when the determined one or more contract terms indicate that the customer rendered payment, selecting, by the one or more processors, an initial stage of the plurality of stages of the flow, wherein the initial stage is a secondary stage that differs from the first stage;
displaying, by the one or more processors, a visual representation of the flow in an interface in the CRM tool, wherein the visual representation indicates the initial stage, a future stage, and an action to be completed to advance to the future stage;
receiving, by the one or more processors, the action from the customer via the interface;
creating, by the one or more processors, a smart contract by employing a term-to-code translation file that maps the one or more contract terms to instructions to include in the smart contract and deploying the smart contract to a digital ledger; and
transmitting, by the one or more processors, a state change to the digital ledger in response to the action being performed in the interface in the CRM tool.

2. The method of claim 1, wherein the visual representation of the flow displays relationships between the one or more actions, one or more completed actions, and one or more incomplete actions.

3. The method of claim 1, further comprising:
receiving, by the one or more processors, a predefined contract from a user;
parsing, by the one or more processors, the predefined contract; and
creating, by the one or more processors, the processing model based on the parsed predefined contract.

4. The method of claim 1, wherein the one or more contract terms comprise a price, a quantity, and a good.

5. The method of claim 1, further comprising:
receiving a notification of a completed action from the digital ledger; and
denoting a stage in the flow as completed in response to the notification.

6. The method of claim 1, further comprising:
determining, by the one or more processors, whether the customer has permission to complete the action prior to allowing the action to be performed in the CRM tool.

7. The method of claim 1, wherein the CRM tool provides a configure, price, quote (CPQ) extension.

8. A system, comprising:
a memory; and
at least one processor coupled to the memory and configured to:
receive a natural-language contract uploaded to a customer relationship management (CRM) tool by a customer;
retrieve a processing model from a set of stored processing models by determining a stored industry type in the CRM tool and selecting the processing model for the stored industry type, wherein the processing model comprises a dictionary of terms used in contracts in the stored industry type;
determine one or more contract terms in the natural-language contract by identifying a contract term in the one or more contract terms that equates to a term in the dictionary of terms;
determine one or more actions performable in the CRM tool associated with the one or more contract terms;
create a flow in the CRM tool comprising the one or more actions and a plurality of stages having a first stage, wherein the first stage is a receive payment stage;
when the determined one or more contract terms indicate that the customer rendered payment, select an initial stage of the plurality of stages of the flow, wherein the initial stage is a secondary stage that differs from the first stage;
display a visual representation of the flow in an interface in the CRM tool, wherein the visual representation indicates the initial stage, a future stage, and an action to be completed to advance to the future stage;
receive an action from the customer via the interface;
create a smart contract by employing a term-to-code translation file that maps the one or more contract terms to instructions to include in the smart contract and deploying the smart contract to a digital ledger; and
transmit a state change to the digital ledger in response to the action being performed in the interface in the CRM tool.

9. The system of claim 8, wherein the visual representation of the flow displays relationships between the one or more actions and the one or more completed actions.

10. The system of claim 8, the at least one processor further configured to:
receive a predefined contract from a user;
parse the predefined contract; and
create the processing model based on the parsed predefined contract.

11. The system of claim 8, wherein the one or more contract terms comprise a price, a quantity, and a good.

12. The system of claim 8, the at least one processor further configured to:
receive a notification of a completed action from the digital ledger; and
denote a stage in the flow as completed in response to the notification.

13. The system of claim 8, the at least one processor further configured to:
determine whether the customer has permission to complete the action prior to allowing the action to be performed in the CRM tool.

14. The system of claim 8, wherein the CRM tool provides a configure, price, quote (CPQ) extension.

15. A non-transitory computer-readable device having instructions stored thereon that, when executed by at least one computing device, cause the at least one computing device to perform operations comprising:

receiving a natural-language contract uploaded to a customer relationship management (CRM) tool by a customer;

retrieving a processing model from a set of stored processing models by determining a stored industry type in the CRM tool and selecting the processing model for the stored industry type, wherein the processing model comprises a dictionary of terms used in contracts in the stored industry type;

determining one or more contract terms in the natural-language contract by identifying a contract term in the one or more contract terms that equates to a term in the dictionary of terms;

determining one or more actions performable in the CRM tool associated with the one or more contract terms;

creating a flow in the CRM tool comprising the one or more actions and a plurality of stages having a first stage, wherein the first stage is a receive payment stage;

when the determined one or more contract terms indicate that the customer rendered payment, selecting an initial stage of the plurality of stages of the flow, wherein the initial stage is a secondary stage that differs from the first stage;

displaying a visual representation of the flow in an interface in the CRM tool, wherein the visual representation indicates the initial stage, a future stage, and an action to be completed to advance to the future stage;

receiving an action from the customer via the interface;

creating a smart contract by employing a term-to-code translation file that maps the one or more contract terms to instructions to include in the smart contract and employing the smart contract to a digital ledger; and transmitting a state change to the digital ledger in response to the action being performed in the interface in the CRM tool.

16. The non-transitory computer-readable device of claim 15, wherein the visual representation of the flow displays relationships between actionable events, completed actionable events, and incomplete actionable events.

17. The non-transitory computer-readable device of claim 15, the operations further comprising:

receiving a notification of a completed action from the digital ledger; and denoting a stage in the flow as completed in response to the notification.

18. The non-transitory computer-readable device of claim 15, the operations further comprising:

receiving a predefined contract from a user;

parsing the predefined contract; and creating the processing model based on the parsed predefined contract.

19. The non-transitory computer-readable device of claim 15, the operations further comprising:

determining whether the customer has permission to complete the action prior to allowing the action to be performed in the CRM tool.

20. The non-transitory computer-readable device of claim 15, wherein the CRM tool provides a configure, price, quote (CPQ) extension.

* * * * *